United States Patent
Steinhauser et al.

(10) Patent No.: US 9,299,328 B2
(45) Date of Patent: Mar. 29, 2016

(54) TILTER FOR A STAND, IN PARTICULAR A CYMBAL STAND

(71) Applicants: Ruben Steinhauser, Altusried (DE); Winfried Holl, Illertissen-Au (DE)

(72) Inventors: Ruben Steinhauser, Altusried (DE); Winfried Holl, Illertissen-Au (DE)

(73) Assignee: GEWA MUSIC GMBH (DE)

( * ) Notice: Subject to any disclaimer, the term of this patent is extended or adjusted under 35 U.S.C. 154(b) by 0 days.

(21) Appl. No.: 13/949,943

(22) Filed: Jul. 24, 2013

(65) Prior Publication Data

US 2014/0033896 A1    Feb. 6, 2014

(30) Foreign Application Priority Data

Aug. 2, 2012  (DE) .................. 10 2012 213 740

(51) Int. Cl.
| | |
|---|---|
| G10D 13/02 | (2006.01) |
| G10G 5/00 | (2006.01) |
| F16M 11/10 | (2006.01) |
| G10D 13/06 | (2006.01) |

(52) U.S. Cl.
CPC .................. *G10G 5/00* (2013.01); *F16M 11/10* (2013.01); *G10D 13/06* (2013.01); *F16M 2200/022* (2013.01); *Y10T 403/32418* (2015.01)

(58) Field of Classification Search
CPC .................................................... G10D 13/00
USPC ........................................... 84/421; 194/421
See application file for complete search history.

(56) References Cited

U.S. PATENT DOCUMENTS

| | | | |
|---|---|---|---|
| 4,363,561 A | 12/1982 | Hsieh | |
| 5,146,808 A * | 9/1992 | Hoshino | F16M 13/027 16/235 |
| 5,154,382 A * | 10/1992 | Hoshino | F16C 11/103 248/185.1 |
| 5,551,745 A | 9/1996 | Huang | |
| 5,756,912 A | 5/1998 | Liao | |
| 5,836,561 A * | 11/1998 | Liao | 248/291.1 |
| 5,845,666 A | 12/1998 | Messner | |
| 6,268,556 B1 | 7/2001 | Liao | |
| 7,040,831 B2 | 5/2006 | Rapaport | |

(Continued)

FOREIGN PATENT DOCUMENTS

| | | |
|---|---|---|
| CN | 2308938 Y | 2/1999 |
| CN | 2445399 Y | 8/2001 |
| CN | 201278258 Y | 7/2009 |
| TW | M244553 U | 9/2004 |

OTHER PUBLICATIONS

Notification of First Office Action for Japan Application No. 201310334760.1; State Intellectual Property Office of the People's Republic of China; Feb. 12, 2015.

(Continued)

*Primary Examiner* — Christopher Uhlir
(74) *Attorney, Agent, or Firm* — Dickinson Wright PLLC

(57) ABSTRACT

A tilter for a stand, in particular a cymbal stand, comprises two elements being movable relative to each other, a connecting means connecting the moveable elements to each other, a locking means for reversibly fixing the position of the movable elements with respect to each other, as well as at least one friction means arranged between the movable elements. In a fixed position of the locking means, the friction means is in frictional contact with a peripheral surface of at least one of the movable elements.

11 Claims, 7 Drawing Sheets

(56) References Cited

U.S. PATENT DOCUMENTS

| | | |
|---|---|---|
| 7,385,127 B2 | 6/2008 | Sato et al. |
| 7,663,040 B1 * | 2/2010 | Hsieh .............................. 84/421 |
| 2005/0087058 A1 | 4/2005 | Chang |
| 2006/0096444 A1 | 5/2006 | Sato |

OTHER PUBLICATIONS

Search Report for Japan Application No. 201310334760.1; State Intellectual Property Office of the People's Republic of China; Feb. 12, 2015.

* cited by examiner

TILTER FOR A STAND, IN PARTICULAR A CYMBAL STAND

CROSS REFERENCE TO RELATED APPLICATIONS

The present application is related to, and claims the benefit of priority from, German Application No. 10 2012 213 740.8, filed 2 Aug. 2012, the disclosure of which is incorporated herein by reference in its entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

FIELD OF THE INVENTION

The present invention concerns a tilter, in particular a tilter for a cymbal for mounting at a cymbal stand according to the preamble of claim 1.

BACKGROUND OF THE INVENTION

The tilting of a cymbal of a drum is important to a drummer for individually positioning, to allow an ideal playing position of the cymbal. For this, each cymbal stand requires a tilter, which allows for adjusting and fixing the inclination of the cymbal with respect to the player. In doing so, it is further important that the position of the cymbal during playing also is reliably maintained.

In order to enable this, tilters are known which, due to high dynamic loads, have realized both shape—as well as force-locking concentric and twistable connections, so called toothed segment tilters. By the engagement of the components due to the toothed segments, however, it was not possible with these systems to conduct steplessly variable adjustments.

As steplessly variable adjustments, however, yield a higher degree of freedom in the arrangement of the instruments, systems were developed, which were supposed to solve this problem. U.S. Pat. No. 7,385,127 presents a system with friction discs, which are pressed together by a fastening force similar to a clutch and thus, due to the friction contact, should achieve a fixation of a movable member of the tilter. Further, other solutions are known, which, for instance, are used similar to a brake or also a drum brake shoe system.

The production of such systems is often difficult and expensive due to the more complex technique. Further, a slipping of the holding arrangement, due to the standardized use of metal elements, may only be prevented to a certain extent, particularly for high mechanical loads during playing.

BRIEF SUMMARY OF THE INVENTION

Therefore, it is an object of the invention, to circumvent at least one of the disadvantages mentioned above and to provide a tilter, which can be produced easily and which provides a reliable hold.

This object is solved according to the invention with a tilter according to claim 1. Advantageous developments are subject to the dependent claims.

A tilter according to the invention, in particular a tilter for a cymbal for fixing it at a cymbal stand comprises two elements, a tilting element, also referred to as cymbal shell, and a fixing element, also referred to as main shell. The tilting element and the fixing element are movable with respect to each other. In doing so, the fixing element is provided to be mounted at a stand, for instance a stand of a cymbal. The tilting element is connected with the fixing element by a connecting element. In a preferred embodiment, the connecting element is a pin, which extends through the fixing element and the tilting element, with the tilting element rotatably arranged around the pin.

Further, preferably a locking element is provided for reversibly fixing the tilting element relative to the fixing element. In the preferred embodiment, the locking element is designed as a screw nut, in particular a wing nut. The locking element therein may also be provided at the fixing element. In doing so, the locking element is arranged such that the distance between the tilting element and the fixing element is reduced. Between the fixing element and the tilting element a friction means is provided. The friction means is designed such that, in a fixed position of the tilter, it is in a friction contact with a peripheral surface, in particular with an inner peripheral surface of the tilting element and/or the fixing element. The peripheral surface therein is provided in a radial direction departing from the connecting means. In this way, a bigger friction surface can be generated between the movable components and a more stable support can be achieved.

The fixing of the tilter at the stand may be effected by receiving a strut of the stand in a receiving means. However, there are various different ways possible, as is readily known to the skilled person. Analogously, a fixing of struts or directly of an instrument at the tilting element may be carried out.

In a preferred embodiment, therefore, the tilter, on the one hand, comprises a main shell, which has a receiving means for a bar and a locking means; on the other hand, the tilter comprises a cymbal shell, which has a receiving means for a cymbal or a cymbal bar.

The inner structure, which is close to the axis, in particular with regard to the inner dimensions of the shells, i.e. of the tilting means and of the fixing means, or with regard to the connecting means arranged between the shells, may be formed identical, preferably symmetrical, with respect to each other.

In this way, it is also possible to provide a tilter, which comprises two main shells, which are provided facing each other. Thus, two bars may be arranged in an arbitrary angle with respect to each other. In doing so, of course, in particular also the two main shells may be formed such that the locking means, which is provided at the connecting means, may be locked on both sides, such that a stepless sliding and locking of the received bars is possible. Further, at both shells a fixation for bars to be received can be possible, as will be described later on exemplarily with regard to the fixing element.

These developments are applicable in the same way also for those embodiments of the invention, which are described in the following.

The friction means may be elastically deformable. In particular, the friction means may be formed such that an axial force, i.e. a force acting in the direction of the action of the force of the locking means during fixing, causes a radial expansion of the entire friction means or at least a part thereof. This expansion, depending on the geometrical design and the choice of material of the friction means, is concentric. Even though the acting force is a compression force onto the friction means, the friction means itself is preferably elastic, however, it is not compressible or only to a small extent. Thereby, in turn a better force closure may be achieved at the contact areas of the movable elements. Certainly, the friction means may also be compressible, depending on which specific characteristics are demanded for the friction means.

In doing so, the elastic characteristics of the friction means preferably are chosen such that the force-induced deformation is reversible and that the friction means returns to the original, undeformed shape after releasing the force.

The friction means may comprise one or more friction discs. These may all have the same mechanical characteristics with regard to elasticity, compressibility, and so on, or may be designed differently.

In a preferred embodiment, the friction means comprises three friction discs, which are arranged side by side, in particular coaxially. In doing so, a disc, in particular the middle one, may be formed as a rigid, indeformable disc. Thereby, again, a higher force transmission to the adjacent discs may be effected. Further, the discs may have the same or different thicknesses, such that the discs may also be used as distance discs, without loosing the function for the tilter.

While in the preferred embodiment the friction means is a separate, freely movable element, embodiments can be thought of, in which a friction disc is fixed to a front surface or to the connecting means by means of the locking element and/or the fixing element.

Further, in the fixing element and/or in the tilting element an urging means may be provided, with which a friction disc received at least partially in the corresponding tilting or fixing means, may be urged toward the opposing fixing or tilting means. This urging means may be supported fixed in place or movably.

Further, it is preferred that the connecting means is enclosed by the tilting element, the fixing element and the friction element radially, in particular concentrically. That way, a rotation of the tilting element around the connecting means is possible, while the friction element may unaffectedly achieve the intended function for establishing a friction contact with a peripheral surface of the tilting element or of the fixing element.

In a preferred development of the invention the friction means comprises a thermoplastic elastomer material. The friction means may be manufactured entirely of this material. Thereby, the manufacturing costs may be reduced. Further, the friction means may only partially, for instance by way of a coating, be manufactured of the elastomer material. That way, characteristics of the friction means and consequently of the tilter tuned to the individual use may be achieved. In doing so, as a material each rubber composite may be considered. In particular, for instance, silicone, natural rubber or a rubber composite with 80 Shore A may be used.

Further, the friction means and, hence, also the friction discs and/or the tilting element or the fixing element, may at least partially comprise a surface profile at the contact faces with one another. This may in particular be formed as a surface roughness. That way, an adhesion may be enhanced, thereby achieving a tighter fit of the tilting element.

In the preferred embodiment, the locking element is a wing nut having a thread which is compatible with a counter thread provided at the connecting means.

Besides the above explanations it is also possible that the connecting means is not designed as a pin but for instance as a connecting means encompassing the fixing element, the tilting element and the friction means, without departing from the spirit of the invention. It may also be a spring-held means, wherein a spring exerts a force onto the friction means.

Due to the flexibility of the friction means, advantageously, vibrations, which are material wearing and acting destructively on the instruments to be held, may be absorbed.

BRIEF DESCRIPTION OF THE SEVERAL VIEWS OF THE DRAWINGS

Details, further advantages and developments of the invention are explained in more detail with the help of embodiments with reference to the illustrations. Therein shows.

DETAILED DESCRIPTION OF THE INVENTION

Figure 1:
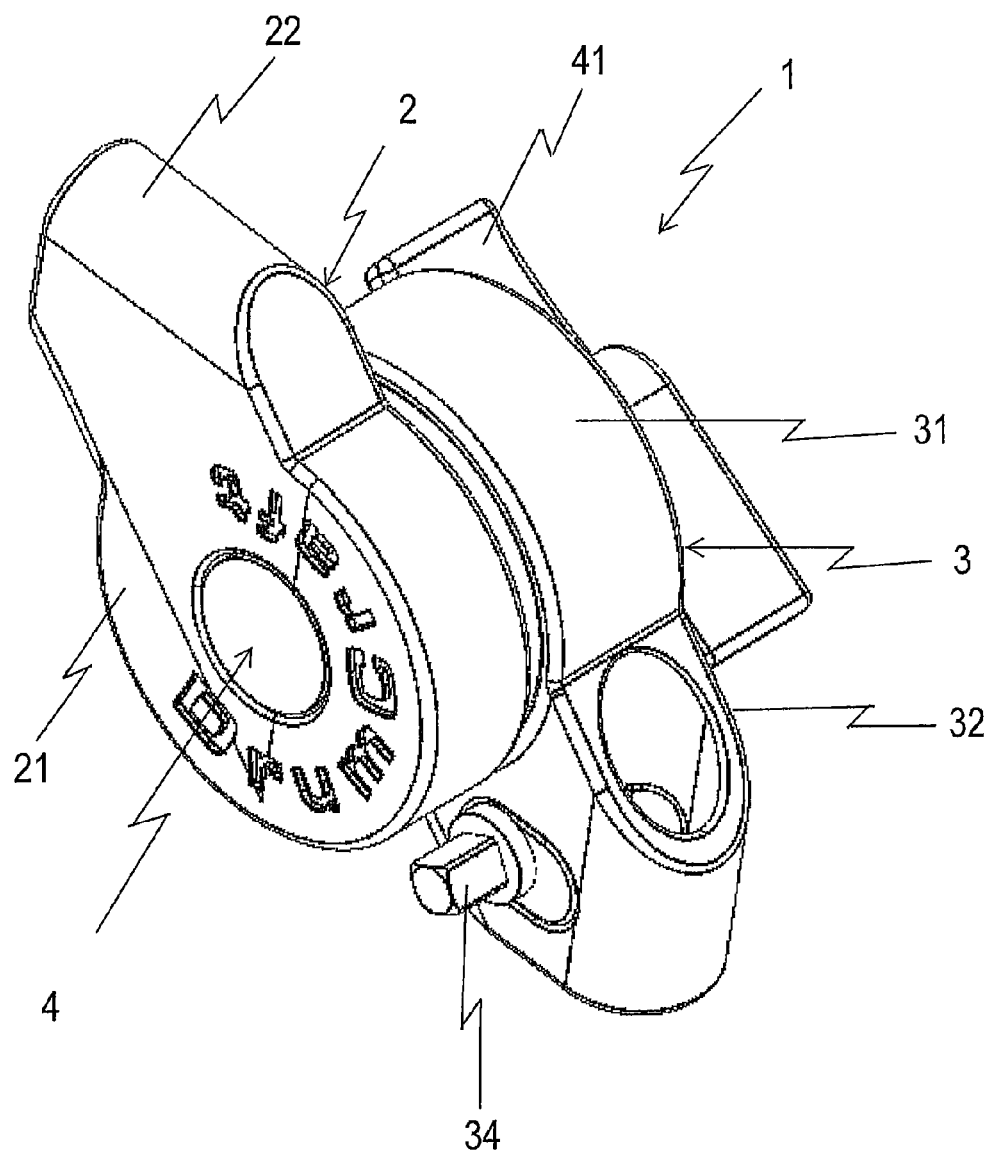
FIG. 1 a perspective front view of a tilter according to a preferred embodiment of the invention.
Figure 5:
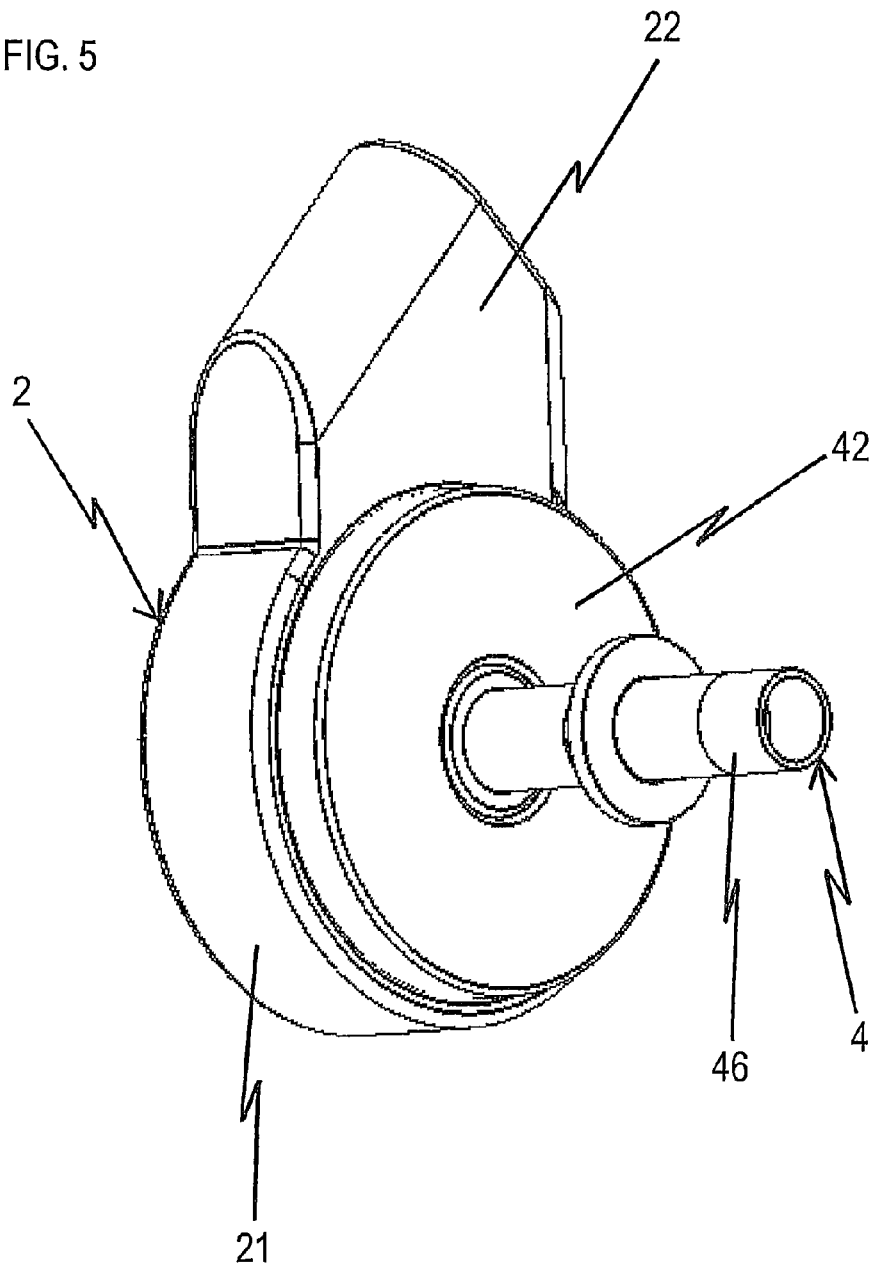
FIG. 5 a perspective back view of the tilting element of the preferred embodiment.

FIG. 1 shows the tilter 1 of a preferred embodiment according to the invention. The tilter 1 substantially consists of a tilting element 2 and a fixing element 3. The tilting element 2 therein in turn consists of two components, which at present are one-pieced, but which may also be designed as two pieces. The first component is the pressure shell 21. The pressure shell 21 is substantially designed in a flat cylinder shape. A face side of the pressure shell is closed, as can be seen in FIG. 1. As is apparent from FIG. 5, the other face side of the imaginary cylinder is open such that the pressure shell 21 is designed as a hollow body.

A second component of the tilting element 2 is an instrument reception 22. The instrument reception 22 serves for receiving an instrument, a strut for fixing an instrument or similar, which is to be coupled with the tilter 1. In the preferred embodiment, the instrument reception 22 in its basic design is also designed in the shape of a hollow cylinder, wherein a face side of the cylinder is open while the other face side is closed. Those faces, which confine the curved surface area of the cylinder, i.e. the bottom and the top of a cylinder, are denoted as face side herein.

Of course, alternatively also both face sides could be open. The instrument reception 22 extends in a tangential direction away from the peripheral surface of the pressure shell 21. In doing so, in this case, a cylinder main axis of the instrument reception 21 (not shown) is orthogonal to a cylinder main axis of the pressure shell. The void of the instrument reception 22 is designed such that an element to be coupled with the tilter 1 may be received.

In the embodiment shown here, in the pressure shell an opening is centrally provided, formed such that a connecting means 4, described later, may protrude therethrough. The pressure shell 21 is constructed rotatably around this connection means 4.

The fixing element 3 of the tilter 1 comprises a similar constructional structure as the tilting element 2 described above. That means, the fixing element 3 also has, in its basic design, a pressure shell 31 shaped as a cylinder, as well as a reception, here a strut reception 32. The strut reception 32 serves for fixing the tilter 1 at a strut of a stand (not shown), in particular of a cymbal stand. Here, the strut reception 32 is also mounted at the pressure shell 31 such that a strut is received in a tangential direction with respect to the pressure shell 31. The hollow-cylindrically formed pressure shell 31 is formed closed at one face side, with an opening for protrusion of the connecting means 4. The other face side of the pressure shell 31 is open. The pressure shell 31 is also rotatably supported around the connecting means 4, such that the tilting element 2 and the fixing element 3 are twistable relative to each other. Further, in the present embodiment, both elements are provided slideably along the connecting means 4. In alternative embodiments also only either the tilting element 2 or the fixing element 3 may be supported slideably along the connecting means 4.

Certainly, it is also possible that the tilting element 2 is coupled with a strut of the stand, while the fixing means 3 is coupled with the instrument, without departing from the spirit of the invention.

The instrument reception 32 is further formed with a fixing means 34, serving to fix the position of the tilter 1 along the stand.

The pressure shell 21 of the tilting element 2 and the pressure shell 31 of the fixing element 3 are connected to each other via the connecting means 4. As is apparent from FIG. 3 and FIG. 5, the connecting means 4 is substantially provided with a head portion 45 and a pin portion 46. The head portion 45 of the connecting piece 4 in cross section has a bigger radius than the pin portion 46. The radius of the pin portion 46 and of the head portion 45 are chosen such that the pin portion 46 but not the head portion 45 of the connecting means can be inserted through the central opening at least of the pressure shell 21 of the tilting element 2. That way, the head portion 45 can form a skewback at the pressure shell 21, as will be described in more detail later on. As is further apparent from FIG. 1, the opening of the pressure shell 21 is formed such that the head portion 45 is sunk in the pressure shell 21.

Figure 2:
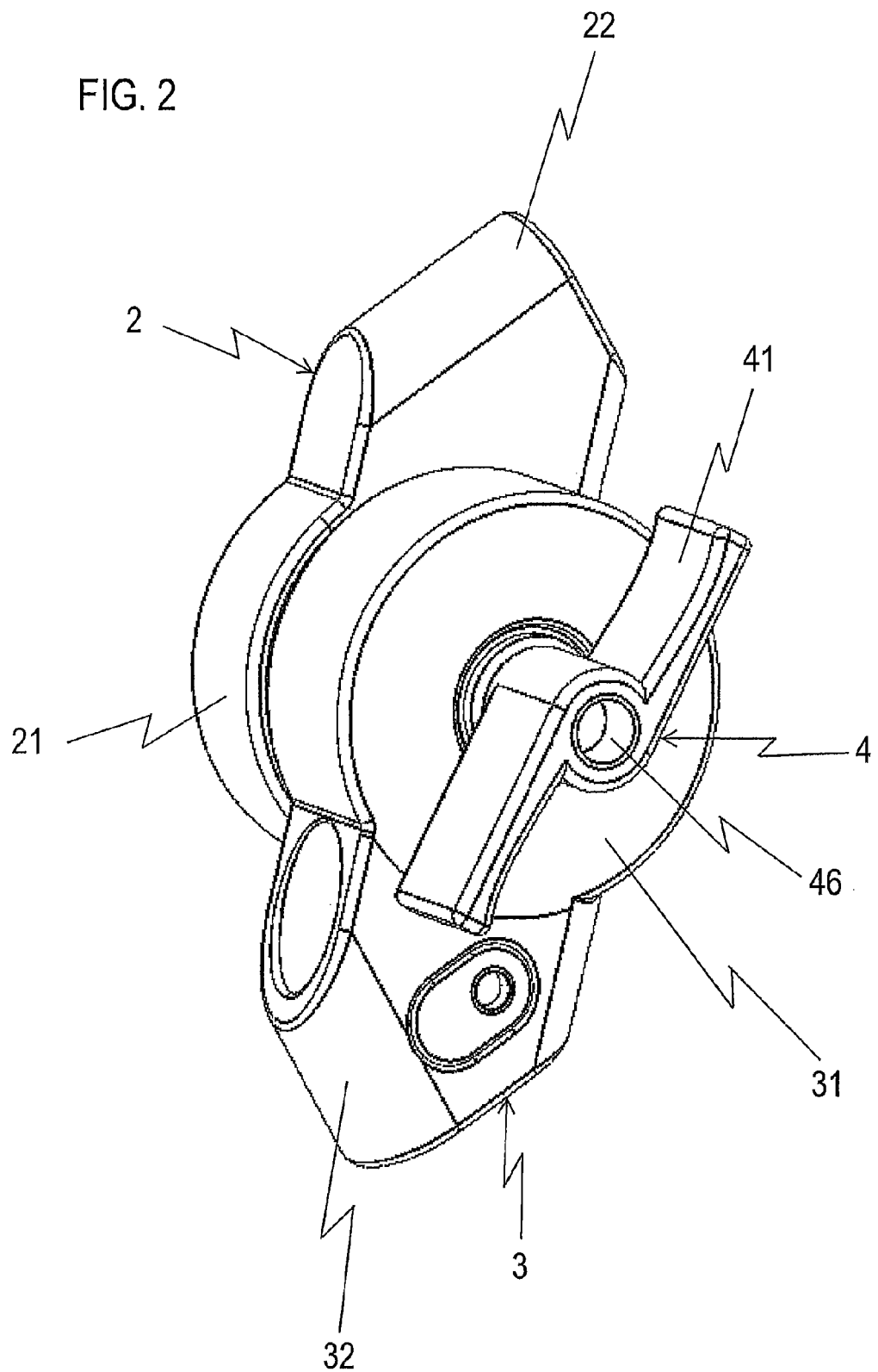
FIG. 2 a perspective back view of the tilter of the preferred embodiment.

The connecting means 4 further is provided at one end of the pin portion 46 opposite to the head portion 45 with a thread not shown. As can be gathered from FIG. 2, the connecting means 4 further comprises a fixing means, here a wing screw 41, for fixing the position of the tilter 1. Of course, also other known fastening means may be used. The wing screw 41 in the shown case is arranged around the free end of the pin portion 46 and comprises a counter thread corresponding to the thread provided there. That way, the wing screw 41 can be screwed onto the pin portion 46.

Figure 3:
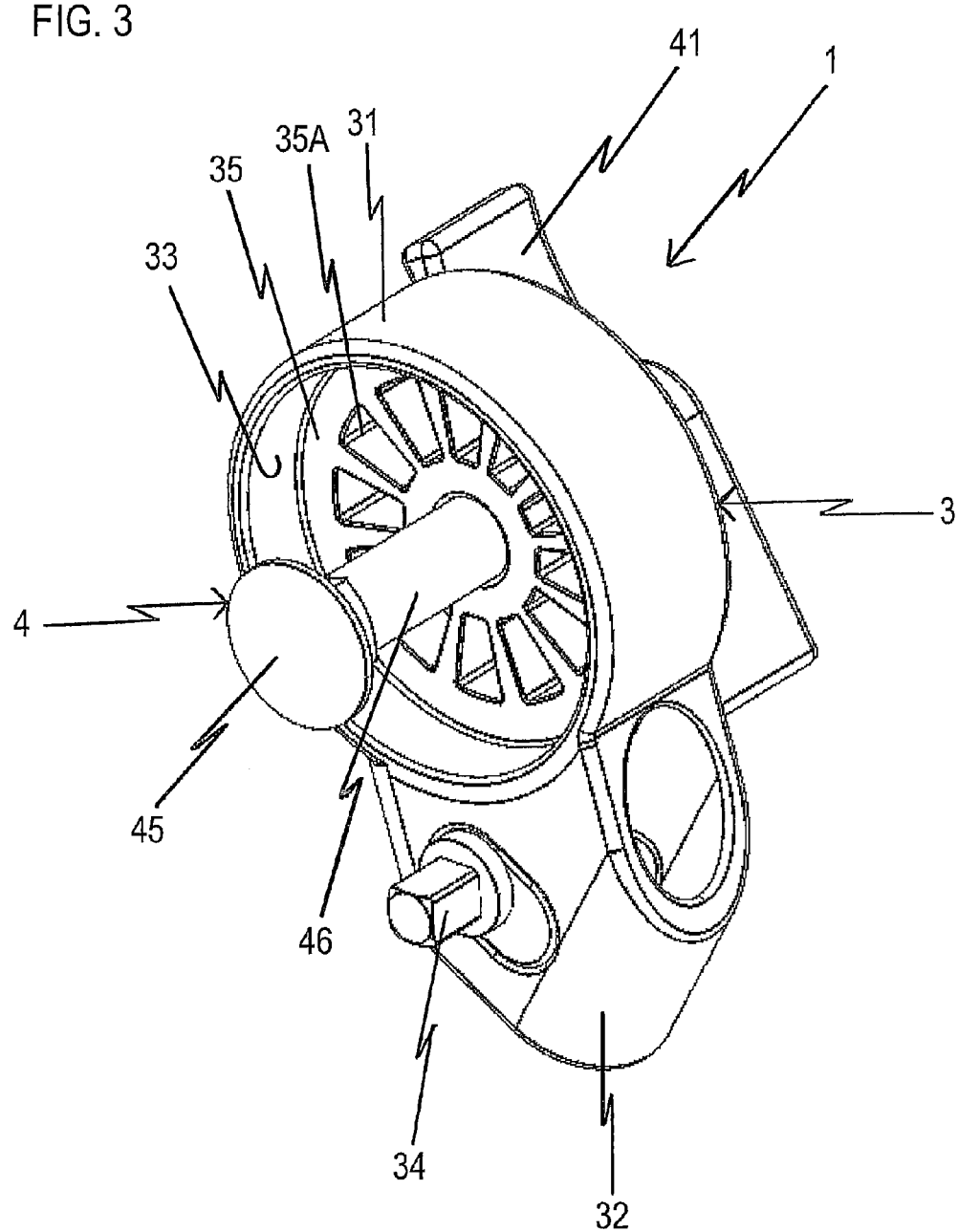
FIG. 3 a perspective front view of the fixing element of the tilter of the preferred embodiment.

FIG. 3 shows in a perspective view the tilter 1 without the tilting element 2. As can be seen, in the pressure shell 31 an urging means 35 is provided. The urging means 35 is formed parallel to the face sides of the pressure shell 31 and extends through the void in the pressure shell 31. The urging means further comprises openings 35A, which extend in the present case tapered in a radial direction starting from the centre of the urging means 35 to the proximity of its periphery. In the centre of the urging means 35, an opening for receiving the pin portion 46 of the connecting means 4 is provided. In this case, the urging means 35 is arranged fixed in place at an inner peripheral wall, also denoted as pressure shell edge of the pressure shell 31. The mounting of the urging means 35 may for instance be effected by welding, soldering, gluing or screwing. It may also be formed integral with the pressure shell 31. In other embodiments, the urging means 35 may also be provided slideably along the connecting means 4. Further, the openings may have different shape or be omitted entirely.

In analogy to the urging means 35 in the pressure shell 31, in the preferred embodiment, also in the pressure shell 21 of the tilting element 2 an urging means not shown herein is provided.

Embodiments may be thought of, in which only one pressure shell 21, 31 comprises a respective urging means.

Figure 4:
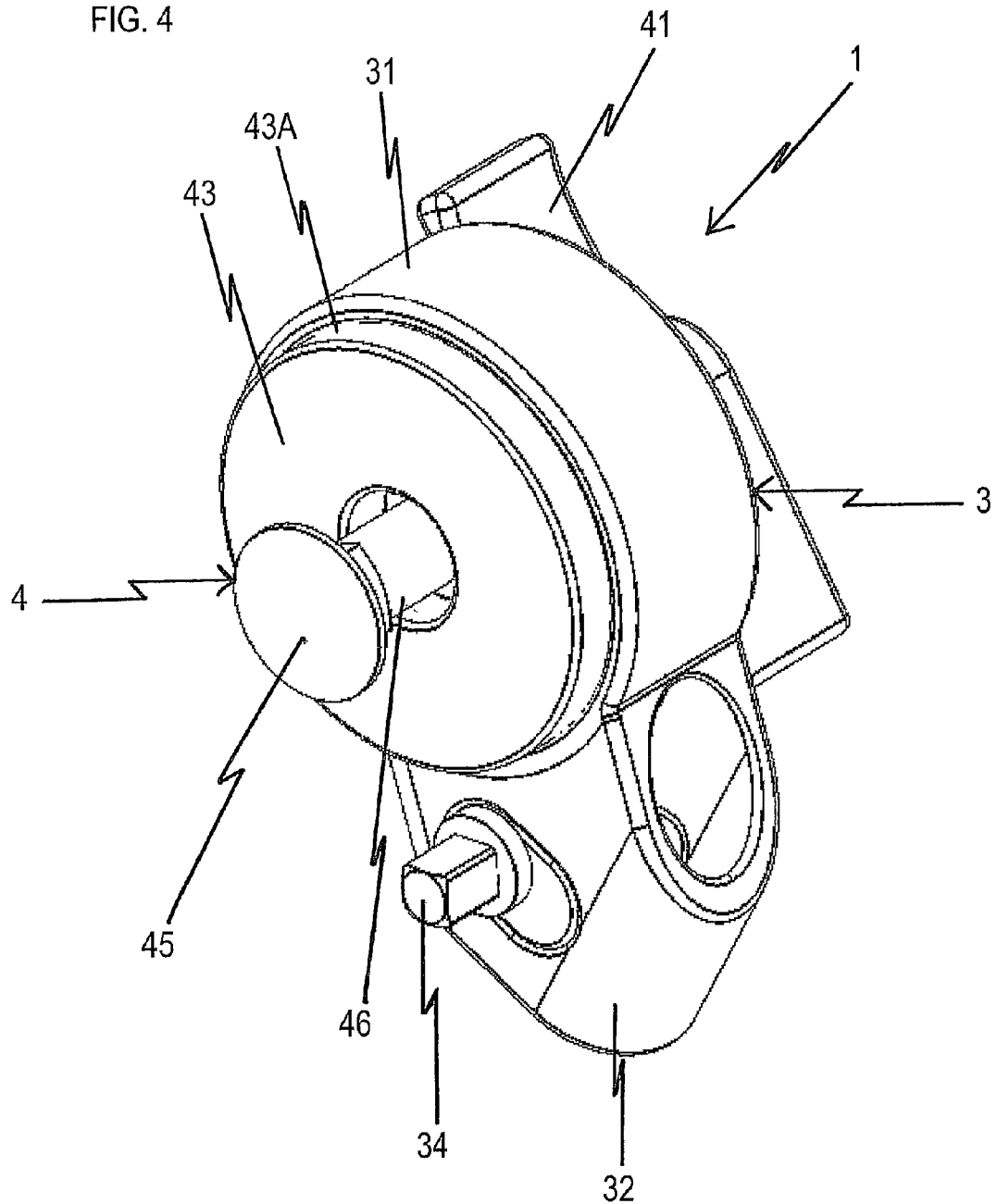
FIG. 4 a perspective front view of the fixing element of the preferred embodiment with a friction disc.

Further, as is shown in FIG. 4, around the connecting means 4 a friction disc 43 is provided. The peripheral shape of the friction disc 43 corresponds to the shape of the pressure shell 31 or the pressure shell 21. The friction disc 42, 43 in the present embodiment is therefore formed as a circular disc. Here, the radius of the friction disc 42, 43 is smaller than the inner radius of the void of the pressure shell 31. In particular, the radius of the friction disc is chosen such that a peripheral surface 43A of the friction disc 43 in an unloaded condition of the friction disc is not received together with a pressure shell edge of a friction disc 42, which is formed identical to the above mentioned friction disc 43, in the pressure shell 21 of the tilting element 2.

For the above descriptions, in the embodiments in which both pressure shells are to receive a friction disc, the pressure shells are deemed to be built analogously with respect to each other. Besides, embodiments are possible in which only one pressure shell is to receive a friction disc, while the respective other pressure shell is fixedly connected with one of the frictions discs.

Figure 6:
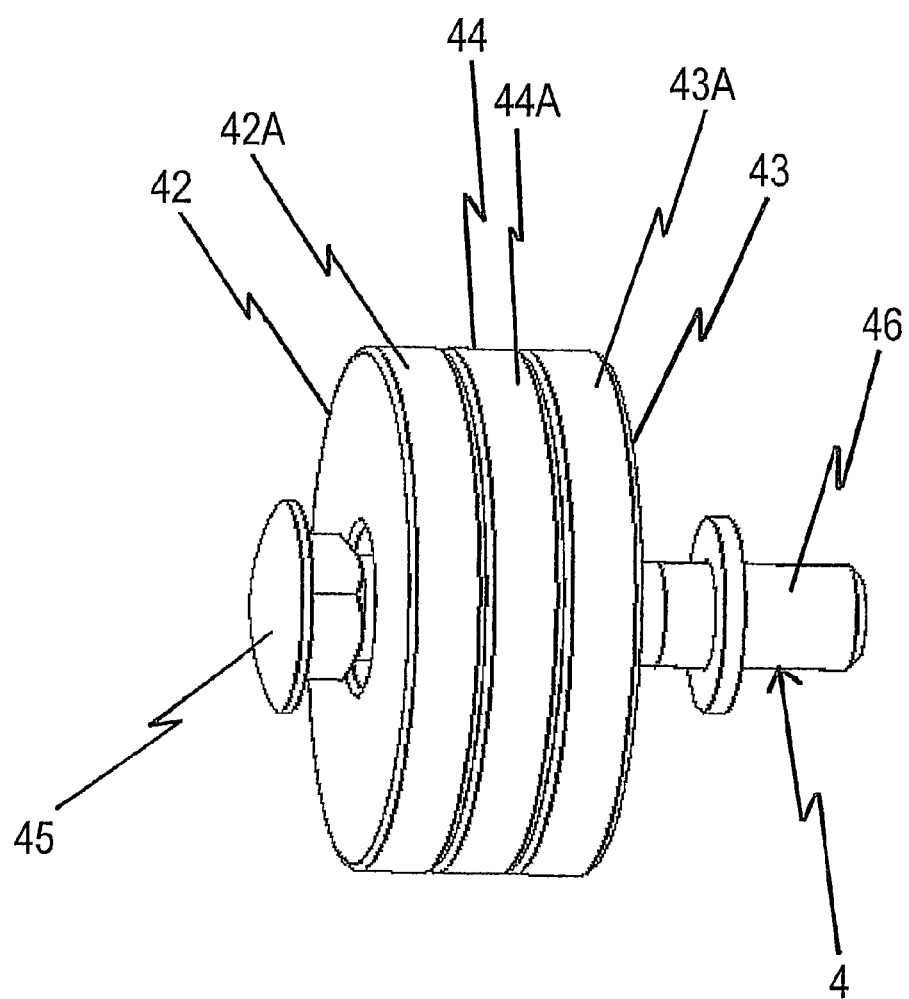
FIG. 6 a perspective view of the connecting means of the tilting element of the preferred embodiment with friction discs.

The connecting means 4 shown in FIG. 6 in so far is only one example for the preferred embodiment. In this case, three identical friction discs 42, 43, 44 are provided, which are arranged in a radial direction around the pin portion 46 of the connecting means 4. Therefore, the friction discs 42, 43, 44 have a through hole in a central area for receiving the connecting means 4.

The friction discs 42, 43, 44 preferably consist of a thermoplastic elastomer material. This elastomer comprises such elastic characteristics that a friction disc 42, 43, 44, which experiences a compression force in an axial direction, expands in a radial direction, in particular concentrically. In doing so, the radius of the friction discs 42, 43, 44 is chosen such that the peripheral surfaces 42A, 43A, 44A in a loaded condition, that is for an applied force to the side faces of the friction discs 42, 43, 44 corresponding to the axial force, would extend farther in radial direction than the inner radius of the pressure shells 21, 31. Thus, a direct contact of the peripheral surfaces of the friction discs 42A, 43A, 44A with the pressure shells 21, 31, in particular with the pressure shell edges 33, results, wherein a friction force between these components becomes bigger, the bigger the force onto the friction discs 42, 43, 44 is.

It is possible that in the illustration according to FIG. 6, a friction disc, for instance the friction disc 44, is a rigid disc, which does not deform due to application of a force and thus only serves for force-coupling.

According to the invention, by doing so, an inclination of the tilter 1 can be achieved in the following way. In a starting position the tilter 1 is open, i.e. the wing screw 41 is not fixed. After the fixing element 3 and the tilting element 2 are coupled with the provided components, the desired inclination angle of the tilting element 2 is set by twisting the tilting element 2 around the connecting means 4. Once the angle is accomplished, the wing screw 41 is screwed tight. Thereby, the pin portion 46 of the connecting means 4 is pulled towards the wing screw 41 by the thread engagement of the wing screw 41.

Figure 7:
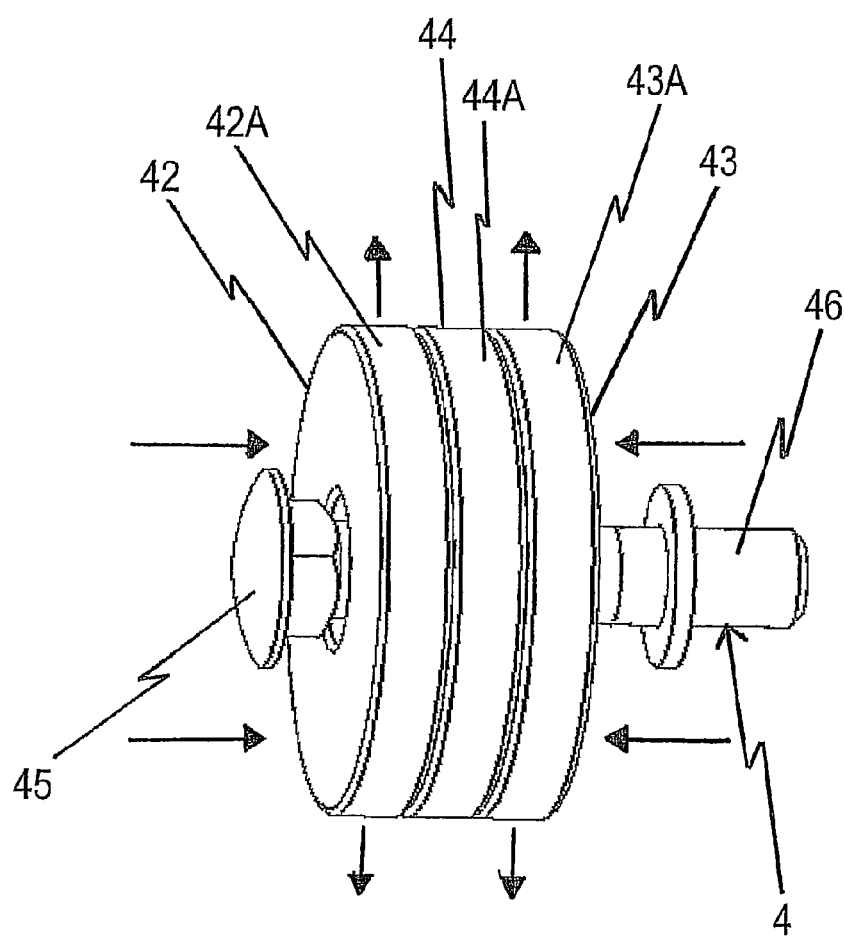
FIG. 7 the friction discs of FIG. 6, having an axial force acting thereon.

Due to the head portion 45 of the connecting means 4 being a skewback, the force of the wing screw 41 is transmitted to the pressure shell 21. Thereby, the pressure shell 21 is urged towards the wing screw and, thus, also towards the pressure shell 31. If the distance between the pressure shells 21, 31 is reduced, the urging means 35 gets into contact with the friction disc 43. This happens analogously in the pressure shell 21 of the tilting element 2. Due to the urging force, which is then executed by the urging means 35 upon the friction disc 43, the friction disc is compressed in an axial direction, i.e. in the direction of force, and extends in a radial direction. This is shown in FIG. 7 with the illustrated arrows. That way, a reliable force closure is achieved between the friction disc 43 and the pressure shell edge 33 of the pressure shell 31. Further, a rotation of the friction discs 42, 43, 44 around the connecting means 4 is prevented due to the same effect.

Conclusively, a tilter 1 for a stand, in particular a cymbal stand, comprises two elements 2, 3, which are movable relative to each other, a connecting means 4, which connects the movable elements 2, 3 with each other, a locking means 41, for reversibly fixing the position of the movable elements 2, 3 with respect to each other, as well as at least one friction means 42, 43, 44, which is arranged between the movable elements 2, 3. Here, the friction means 42, 43, 44 is, in a fixed position of the locking means 41, in friction contact with a peripheral surface 33 of at least one of the movable elements 2, 3.

Such tilters of course are also applicable for other areas of application and thus are not restricted to musical instrument stands in general and cymbal stands in particular. Applications are also possible in the workshop or laboratory sector, where a reliable hold of working resources at a strut is necessary.

LIST OF REFERENCE SIGNS

1 tilter
2 tilting element
3 fixing element
4 connecting element
21 pressure shell
22 instrument reception
31 pressure shell
32 strut reception
33 pressure shell edge
34 fixing means
35 urging means
35A opening
41 wing screw
42 friction disc
42A peripheral friction surface
43 friction disc
43A peripheral friction surface
44 friction disc
45 head portion
46 pin portion

The invention claimed is:

1. A tilter with two elements being movable with respect to each other, a connecting means connecting the movable elements to each other, at least one locking means for reversibly fixing a position of the movable elements with respect to each other, as well as at least one friction means arranged between the movable elements, wherein the at least one friction means is formed such that it experiences, due to an axial compression force, a radial, reversible extension and is, in a fixed position of the at least one locking means, in frictional contact with a radial peripheral surface of at least one of the movable elements;
    wherein the at least one friction means comprises a plurality of friction discs of a thermoplastic elastomer material which are in frictional contact with each other in a fixed position of the at least one locking means.

2. The tilter according to claim 1, wherein one of the movable elements is a tilting element and the other movable element is a fixing element.

3. The tilter according to claim 1, wherein the movable elements are constructed identically, in particular both being a fixing element.

4. The tilter according to claim 1, wherein an inner structure of the movable elements is constructed identically, in particular symmetrically.

5. The tilter according to claim 1, wherein the at least one friction means is elastically deformable.

6. The filter according to claim 1, wherein the radial, reversible extension is a concentric, reversible extension due to the axial compression force.

7. The tilter according to claim 1, wherein the movable elements and the at least one friction means are arranged radially around the connecting means, and wherein further, in a fixed position of the at least one locking means, the at least one friction means is in contact with an urging means of at least one of the movable elements.

8. The tilter according to claim 1, wherein at least one of the movable elements and/or the at least one friction means at least partially comprises a surface profile at a respective contact surface.

9. The tilter according to claim 1, wherein the connecting means comprises a pin portion having a thread portion and extending through the movable elements and the at least one friction means, and a wing nut corresponding to the thread portion for fixing the tilter.

10. A cymbal stand comprising a tilter with two elements being movable with respect to each other, a connecting means connecting the movable elements to each other, at least one locking means for reversibly fixing a position of the movable elements with respect to each other, as well as at least one friction means arranged between the movable elements, wherein the at least one friction means is formed such that it experiences, due to an axial compression force, a radial, reversible extension and is, in a fixed position of the at least one locking means, in frictional contact with a radial peripheral surface of at least one of the movable elements;
    wherein the at least one friction means comprises a plurality of friction discs of a thermoplastic elastomer material which are in frictional contact with each other in a fixed position of the at least one locking means.

11. A tilter with two elements being movable with respect to each other, a connecting means connecting the movable elements to each other, at least one locking means for reversibly fixing a position of the movable elements with respect to each other, as well as a plurality of friction discs of elastomeric material arranged between the movable elements, wherein the plurality of friction discs, in a fixed position of the at least one locking means, are in frictional contact with each other and with a radial peripheral surface of at least one of the movable elements.

* * * * *